United States Patent
Su et al.

(10) Patent No.: US 12,199,747 B2
(45) Date of Patent: Jan. 14, 2025

(54) DATA FRAME TRANSMISSION METHOD AND RELATED DEVICE

(71) Applicant: Huawei Technologies Co., Ltd., Shenzhen (CN)

(72) Inventors: Wei Su, Dongguan (CN); Liang Sun, Dongguan (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 18/069,659

(22) Filed: Dec. 21, 2022

(65) Prior Publication Data

US 2023/0122525 A1 Apr. 20, 2023

Related U.S. Application Data (63) Continuation of application No. PCT/CN2021/100534, filed on Jun. 17, 2021.

(30) Foreign Application Priority Data

Jun. 22, 2020 (CN) .......................... 202010575556.9

(51) Int. Cl.
*H04J 3/16* (2006.01)
*H04L 5/00* (2006.01)

(52) U.S. Cl.
CPC ............ *H04J 3/167* (2013.01); *H04L 5/0053* (2013.01)

(58) Field of Classification Search
None
See application file for complete search history.

(56) References Cited

U.S. PATENT DOCUMENTS

| 2005/0013296 | A1  | 1/2005  | Imazeki et al. |
| 2012/0250739 | A1* | 10/2012 | Nagaki ............ H04J 3/085 375/219 |
| 2012/0251127 | A1* | 10/2012 | Ohkubo ............ H04J 3/1652 398/182 |
| 2020/0153529 | A1  | 5/2020  | Su et al. |

FOREIGN PATENT DOCUMENTS

| CN | 107437973 A  | * | 12/2017 |
| JP | 2017059892 A |   | 3/2017  |
| RU | 2594296 C1   |   | 8/2016  |

OTHER PUBLICATIONS

Trowbridge, S.J., "Standards for Optical Transport Networks", In: Mukherjee et al: Springer Handbook of Optical Networks. Springer Handbooks. Springer, Cham, Oct. 15, 2020, https://doi.org/10.1007/978-3-030-16250-4_13, 1182 pages.

* cited by examiner

Primary Examiner — David W Lambert
(74) Attorney, Agent, or Firm — Slater Matsil, LLP (57) ABSTRACT

Embodiments of the present invention disclose a data frame transmission method and a related device. The method includes: first, generating a data frame, where an overhead area of the data frame includes a target bit, the target bit simultaneously indicates at least two multiframes, the multiframe includes a plurality of consecutive data frames, different multiframes include different quantities of data frames, different overhead information is inserted into the different multiframes, and the data frame is an optical transport network OTN data frame; and then sending the data frame.

20 Claims, 8 Drawing Sheets

|  | First multiframe 401 | First multiframe 402 | First multiframe 403 | First multiframe 404 | First multiframe 405 |
| --- | --- | --- | --- | --- | --- |
| Value of a target bit of a 1st data frame | First value | First value | First value | First value | First value |
| Value of a target bit of a 2nd data frame | Second value | First value | First value | First value | Second value |
| Value of a target bit of a 3rd data frame | Second value | Second value | First value | First value | Second value |
| Value of a target bit of a 4th data frame | Second value | Second value | Second value | First value | Second value |
| Value of a target bit of a 5th data frame | Second value | Second value | Second value | Second value | Second value |

FIG. 4

| Quantity of target bits whose values are 1 and that are included in each first multiframe | 1 | 2 | 3 | ... | 15 | 16 |
|---|---|---|---|---|---|---|
| Quantity of target bits whose values are 0 and that are included in each first multiframe | 31 | 30 | 29 | ... | 17 | 16 |
|  | 1st first multiframe | 2nd first multiframe | 3rd first multiframe | ... | 15th first multiframe | 16th first multiframe |
| Value of a target bit of a 1st data frame | 1 | 1 | 1 | ... | 1 | 1 |
| Value of a target bit of a 2nd data frame | 0 | 1 | 1 | ... | 1 | 1 |
| ... | ... | ... | ... | ... | ... | ... |
| Value of a target bit of a 31st data frame | 0 | 0 | 0 | ... | 0 | 0 |
| Value of a target bit of a 32nd data frame | 0 | 0 | 0 | ... | 0 | 0 |

FIG. 5

| Quantity of target bits whose values are 1 and that are included in each first multiframe | 1 | 2 | ... | 8 |
|---|---|---|---|---|
| Quantity of target bits whose values are 0 and that are included in each first multiframe | 31 | 30 | ... | 24 |
| | 1st 32 frames | 2nd 32 frames | ... | 8th 32 frames |
| Value of a target bit of a 1st data frame | 1 | 1 | ... | 1 |
| Value of a target bit of a 2nd data frame | 0 | 1 | ... | 1 |
| Value of a target bit of a 3rd data frame | 0 | 0 | ... | 1 |
| Value of a target bit of a 4th data frame | 0 | 0 | ... | 1 |
| Value of a target bit of a 5th data frame | 0 | 0 | ... | 1 |
| Value of a target bit of a 6th data frame | 0 | 0 | ... | 1 |
| Value of a target bit of a 7th data frame | 0 | 0 | ... | 1 |
| Value of a target bit of an 8th data frame | 0 | 0 | ... | 1 |
| Value of a target bit of a 9th data frame | 0 | 0 | ... | 0 |
| ... | ... | ... | ... | ... |
| Value of a target bit of a 32nd data frame | 0 | 0 | ... | 0 |

FIG. 6

| Quantity of target bits whose values are 1 and that are included in each first multiframe | 2 | ... | 16 |
|---|---|---|---|
| Quantity of target bits whose values are 0 and that are included in each first multiframe | 30 | ... | 16 |
|  | 1st first multiframe | ... | 8th first multiframe |
| Value of a target bit of a 1st data frame | 1 | ... | 1 |
| Value of a target bit of a 2nd data frame | 1 | ... | 1 |
| Value of a target bit of a 3rd data frame | 0 | ... | 1 |
| Value of a target bit of a 4th data frame | 0 | ... | 1 |
| Value of a target bit of a 5th data frame | 0 | ... | 1 |
| Value of a target bit of a 6th data frame | 0 | ... | 1 |
| Value of a target bit of a 7th data frame | 0 | ... | 1 |
| Value of a target bit of an 8th data frame | 0 | ... | 1 |
| Value of a target bit of a 9th data frame | 0 | ... | 1 |
| Value of a target bit of a 10th data frame | 0 | ... | 1 |
| Value of a target bit of an 11th data frame | 0 | ... | 1 |
| Value of a target bit of a 12th data frame | 0 | ... | 1 |
| Value of a target bit of a 13th data frame | 0 | ... | 1 |
| Value of a target bit of a 14th data frame | 0 | ... | 1 |
| Value of a target bit of a 15th data frame | 0 | ... | 1 |
| Value of a target bit of a 16th data frame | 0 | ... | 1 |
| Value of a target bit of a 17th data frame | 0 | ... | 0 |
| ... | ... | ... | ... |
| Value of a target bit of a 32nd data frame | 0 | ... | 0 |

DATA FRAME TRANSMISSION METHOD AND RELATED DEVICE

CROSS-REFERENCE TO RELATED APPLICATIONS

This application is a continuation of International Application No. PCT/CN2021/100534, filed on Jun. 17, 2021, which claims priority to Chinese Patent Application No. 202010575556.9, filed on Jun. 22, 2020. The disclosures of the aforementioned applications are hereby incorporated by reference in their entireties.

TECHNICAL FIELD

This application relates to the optical communications field, and in particular, to a data frame transmission method and a related device.

BACKGROUND

Due to characteristics such as high bandwidth, a large capacity, high reliability, and a low latency of an optical transport network (OTN), the optical transport network has become a mainstream technology used for a transport network.

To expand space that is of an OTN frame and that is used to carry an overhead, a multiframe alignment signal (MFAS) is set in the OTN frame. The MFAS occupies one byte of the OTN frame. The MFAS indicates different multiframes by using different quantities of bits included in the MFAS. Different multiframes are used to carry different overhead information.

However, the MFAS occupies a large quantity of bits, resulting in a waste of a bandwidth resource of the OTN. In addition, because different quantities of bits are used to indicate different multiframes, complexity of inserting and parsing the MFAS in the OTN frame is high, and efficiency is reduced.

SUMMARY

Embodiments of this application provide a data frame transmission method and a related device, to effectively improve utilization of bandwidth for indicating a multiframe.

According to a first aspect, an embodiment of the present invention provides a data frame transmission method. The method includes: First, a sending device generates a data frame. An overhead area of the data frame includes a target bit, the target bit simultaneously indicates at least two multiframes, the multiframe includes a plurality of consecutive data frames, different multiframes include different quantities of data frames, different overhead information is inserted into the different multiframes, and the data frame is an optical transport network OTN data frame. Then, the sending device sends the data frame to a receiving device.

It can be learned that the target bit located in the data frame simultaneously indicates the at least two multiframes, so that efficiency of indicating a multiframe is improved, and complexity of indicating a multiframe is reduced, to effectively save a bandwidth resource, and improve utilization efficiency of a bandwidth resource for indicating a multiframe.

Based on the first aspect, in an optional implementation, that a sending device generates a data frame includes: The sending device respectively inserts a plurality of target bits into overhead areas of a plurality of data frames included in a first multiframe. The first multiframe is any of the at least two multiframes, values of any two adjacent target bits in the plurality of target bits each are a first value, or values of any two adjacent target bits transition from a first value to a second value, and the first value is different from the second value.

It can be learned that the sending device can accurately indicate, based on a value of the target bit, each data frame located in a same first multiframe, so that efficiency of indicating the first multiframe by using the target bit is improved.

Based on the first aspect, in an optional implementation, that a sending device generates a data frame includes: The sending device respectively inserts a first target bit and a second target bit into two adjacent first multiframes. The first target bit is located in a last data frame in a former multiframe in the two adjacent first multiframes, the second target bit is located in a $1^{st}$ data frame in a latter multiframe in the two adjacent first multiframes, a value of the first target bit is the second value, and a value of the second target bit is the first value.

Based on the first aspect, in an optional implementation, a first target bit and a second target bit are inserted into two consecutive data frames, the two consecutive data frames belongs to different multiframes, a value of the first target bit is the second value, and a value of the second target bit is the first value.

It can be learned that the first target bit whose value is the second value transitions to the second target bit whose value is the first value, so that the sending device accurately indicates a frame boundary of the first multiframe, to improve efficiency of indicating the first multiframe by using the target bit.

Based on the first aspect, in an optional implementation, the at least two multiframes further include a second multiframe, the second multiframe includes a plurality of first multiframes, and that a sending device generates a data frame includes: determining a target quantity, where the target quantity indicates a ranking of a target first multiframe in the second multiframe, and the target first multiframe is one of the plurality of first multiframes included in the second multiframe; and determining, based on the target quantity, a value of a target bit included in the target first multiframe, where the value of the target bit further indicates a frame boundary of the second multiframe.

Based on the first aspect, in an optional implementation, the target quantity is N, N is a positive integer greater than or equal to 1, and the determining, based on the target quantity, a value of a target bit included in the target first multiframe includes: determining that values of first N target bits in a plurality of target bits included in the target first multiframe each are the first value.

Based on the first aspect, in an optional implementation, the target quantity is N, N is a positive integer greater than or equal to 1, and the determining, based on the target quantity, a value of a target bit included in the target first multiframe includes: determining that values of first C target bits in a plurality of target bits included in the target first multiframe each are the first value, where C is an integer multiple of N.

Based on the first aspect, in an optional implementation, the frame boundary of the second multiframe includes a multiframe including a smallest quantity of target bits whose values are the first value, and the frame boundary of the second multiframe further includes a multiframe including a largest quantity of target bits whose values are the first value.

It can be learned that the sending device accurately indicates the frame boundary of the second multiframe by using the target bit, so that efficiency of indicating the second multiframe by using the target bit is improved.

Based on the first aspect, in an optional implementation, a bit quantity of the target bit is 1.

It can be learned that the at least two multiframes can be indicated by using a target bit whose size is only 1 bit, to improve efficiency of indicating a multiframe, and save a bandwidth resource for indicating a multiframe.

According to a second aspect, an embodiment of the present invention provides a data frame transmission method, the method includes: First, a receiving device receives a plurality of data frames. An overhead area of each data frame includes a target bit, the target bit simultaneously indicates at least two multiframes, the multiframe includes a plurality of consecutive data frames, different multiframes include different quantities of data frames, different overhead information is inserted into the different multiframes, and the data frame is an optical transport network OTN data frame. Then, the receiving device obtains the target bit from each data frame. Finally, the receiving device determines the at least two multiframes in the plurality of data frames based on the target bit.

It can be learned that the receiving device can determine the at least two multiframes only by using the target bit, so that efficiency of determining the at least two multiframes by the receiving device is improved, and accuracy of performing frame alignment on the at least two multiframes by the receiving device is improved, to effectively save a bandwidth resource, and improve utilization efficiency of a bandwidth resource for indicating a multiframe.

Based on the second aspect, in an optional implementation, that the receiving device determines the at least two multiframes in the plurality of data frames based on the target bit includes: determining a first multiframe in the plurality of data frames. The first multiframe is any of the at least two multiframes, and in a plurality of target bits included in the first multiframe, values of any two adjacent target bits each are a first value, or values of any two adjacent target bits transition from a first value to a second value, and the first value and the second value are different from each other.

Based on the second aspect, in an optional implementation, that the receiving device determines the at least two multiframes in the plurality of data frames based on the target bit includes: determining a first target bit and a second target bit that are adjacent to each other in the plurality of data frames, where a value of the first target bit is the second value, and a value of the second target bits is the first value; and determining that the first target bit and the second target bit are located in two adjacent first multiframes, where the first target bit is located in a last data frame in a former multiframe in the two adjacent first multiframes, and the second target bit is located in a $1^{st}$ data frame in a latter multiframe in the two adjacent first multiframes.

It can be learned that the receiving device can accurately perform frame alignment on the first multiframe based on the target bit, to improve efficiency and accuracy of performing frame alignment on the first multiframe.

Based on the second aspect, in an optional implementation, the at least two multiframes further include a second multiframe, the second multiframe includes a plurality of first multiframes, and that the receiving device determines the at least two multiframes in the plurality of data frames based on the target bit includes: determining a target quantity based on a value of a target bit included in a target first multiframe. The target quantity indicates a ranking of the target first multiframe in the second multiframe, and the target first multiframe is one of the plurality of first multiframes included in the second multiframe.

Based on the second aspect, in an optional implementation, that the receiving device determines a target quantity based on a value of a target bit included in a target first multiframe includes: if values of first N target bits in a plurality of target bits included in the target first multiframe each are the first value, determining that the target quantity is equal to N.

Based on the second aspect, in an optional implementation, that the receiving device determines a target quantity based on a value of a target bit included in a target first multiframe includes: if values of first C target bits in a plurality of target bits included in the target first multiframe each are the first value, determining that the target quantity is equal to a quotient of C.

Based on the second aspect, in an optional implementation, that the receiving device determines the at least two multiframes in the plurality of data frames based on the target bit includes: determining a frame boundary of the second multiframe, where the frame boundary of the second multiframe includes a multiframe with a minimum value of the target quantity, and the frame boundary of the second multiframe further includes a multiframe with a maximum value of the target quantity.

It can be learned that the receiving device can accurately perform frame alignment on the second multiframe based on the target bit, to perform frame alignment, to improve efficiency and accuracy of performing frame alignment on the second multiframe.

Based on the second aspect, in an optional implementation, a bit quantity of the target bit is 1.

It can be learned that a bit quantity of the target bit used to indicate the at least two multiframes is very small, to effectively reduce difficulty of performing frame alignment on the at least two multiframes by the receiving device based on the target bit, and improve frame alignment efficiency.

According to a third aspect, an embodiment of this application provides a digital processing chip. The chip includes a processor and a memory, the memory and the processor are interconnected through a line, the memory stores instructions, and the processor is configured to perform the method in the first aspect or the second aspect.

According to a fourth aspect, an embodiment of this application provides a sending device, including a processor and a memory. The processor and the memory are interconnected, and the processor invokes program code in the memory, to perform the method in any one of the first aspect or the implementations of the first aspect.

According to a fifth aspect, an embodiment of this application provides a receiving device, including a processor and a memory. The processor and the memory are interconnected, and the processor invokes program code in the memory, to perform the method in any one of the second aspect or the implementations of the second aspect.

According to a sixth aspect, an embodiment of the present invention provides a computer-readable storage medium, including instructions, and when the instructions are run on a computer, the computer is enabled to perform the method in any one of the first aspect or the second aspect.

According to a seventh aspect, an embodiment of the present invention provides a computer program product including instructions, and when the instructions are run on a computer, the computer is enabled to perform the method in any one of the first aspect or the second aspect.

DETAILED DESCRIPTION OF ILLUSTRATIVE EMBODIMENTS

Figure 1:
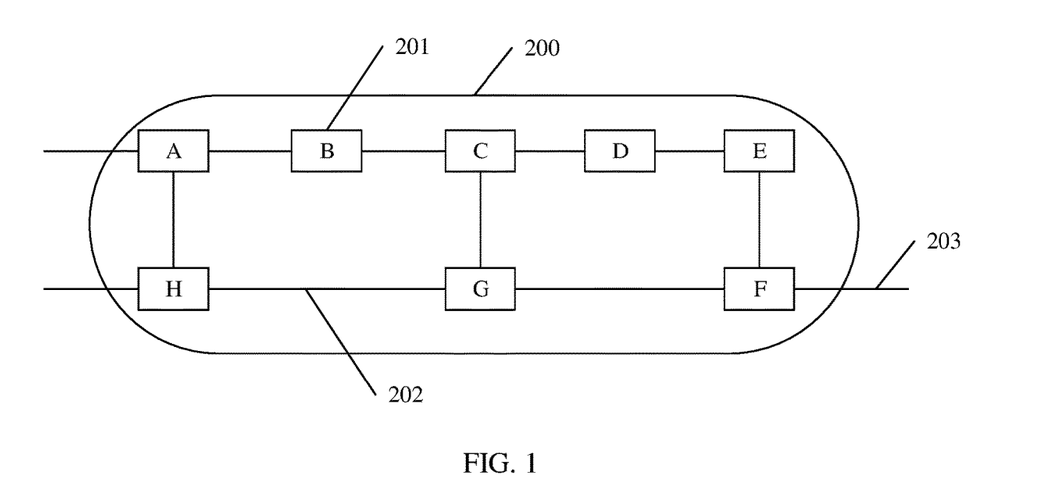
FIG. 1 is a schematic diagram of a structure of an optical network according to an embodiment of the present invention.

To better understand a data frame transmission method provided in this application, the following first describes, with reference to FIG. 1, an optical network to which the method in this application is applied. FIG. 1 is a schematic diagram of a structure of an optical network according to an embodiment of the present invention.

A data frame transmission method provided in this application is applicable to the optical network, for example, an OTN. An OTN is usually formed by connecting a plurality of network devices by using a fiber, and the OTN may be of different topology types such as a line type, a ring type and a mesh type based on a specific requirement. An OTN 200 shown in FIG. 1 includes eight OTN devices 201, to be specific, devices A to H. 202 indicates a fiber, and is configured to connect two devices. 203 indicates a customer service interface, and is configured to receive or send customer service data. Based on an actual requirement, an OTN device may have different functions. Usually, the OTN device includes an optical layer device, an electrical layer device, and a photoelectric hybrid device. The optical layer device is a device that can process an optical layer signal, for example, an optical amplifier (OA) or an optical add/drop multiplexer (OADM). The OA may also be referred to as an optical line amplifier (OLA), and is mainly configured to amplify an optical signal, to support a longer distance transmission when specific performance of the optical signal is ensured. The OADM is configured to perform space transformation on the optical signal, so that the optical signal can be output from different output ports (sometimes referred to as directions). The electrical layer device is a device that can process an electrical layer signal, for example, a device that can process an OTN signal. The photoelectric hybrid device is a device that has a capability of processing an optical layer signal and an electrical layer signal. It should be noted that, based on a specific integration requirement, a plurality of different functions may be integrated into one OTN device. A technical solution provided in this application is applicable to OTN devices that have different forms and degrees of integration and that include an electrical layer function.

It should be noted that in this embodiment of this application, an example in which a data frame is an OTN frame is used for description. The OTN frame is used to carry various pieces of service data and provide rich management and monitoring functions. The OTN frame may be an optical service unit (OSU) frame, an ODUk frame, an ODUCn frame, an ODUflex frame, an optical transport unit k (OTUk) frame, an OTUCn frame, a flexible OTN (FlexO) frame, or the like. A difference between an ODU frame and an OTU frame is that the OTU frame includes the ODU frame and an OTU overhead; k represents different rate levels, for example, k=1 represents 2.5 Gbps, and k=4 represents 100 Gbps; and Cn represents a variable rate, specifically a rate that is a positive integer multiple of 100 Gbps. Unless otherwise specified, the ODU frame is any of the ODUk frame, the ODUCn frame, or the ODUflex frame, and the OTU frame is any of the OTUk frame, the OTUCn frame, or the FlexO frame. It should be further noted that with development of an OTN technology, a new type of OTN frame may be defined, and is applicable to this application.

It should be noted that a description of the data frame in this embodiment is an optional example and imposes no limitation. The data frame provided in this application may alternatively be applied to a passive optical network (PON) and a flexible Ethernet (FlexE).

To improve carrying efficiency with which the OTN frame carries a low rate frame, an example in which the OTN frame is an OSU frame is used for description in this application. In another example, the OTN frame may alternatively be a flexible optical service unit (OSUflex). It should be noted that a name OSU is only an example, and imposes no limitation on a frame structure defined in this application. The name may alternatively be replaced with another name such as a low rate frame, a low rate service frame, or an optical service data unit frame.

Figure 2:
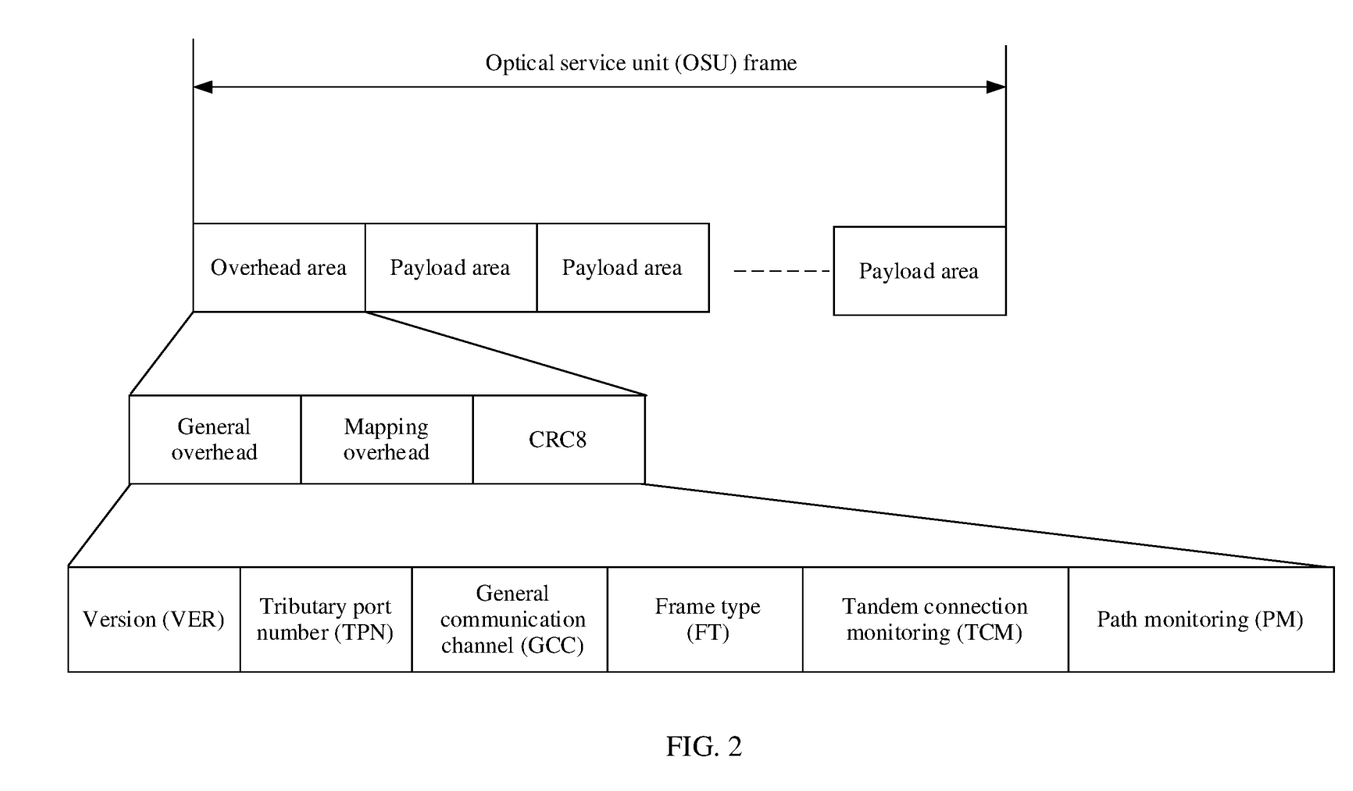
FIG. 2 is an example diagram of a structure in an embodiment of a data frame according to this application.

FIG. 2 is a schematic diagram of a structure of a possible OSU frame. In this embodiment, a specific quantity of overhead areas and a specific quantity of payload areas included in the OSU frame are not limited. In FIG. 2, an example in which the OSU frame includes one overhead area and a plurality of payload areas is used for description.

The OSU frame includes 192 bytes. The overhead area includes 7 bytes, and the payload area includes 185 bytes. Various overhead information such as a general overhead, a mapping overhead, and an 8-bit cyclic redundancy check (CRC8) of 1 byte needs to be inserted in the overhead area. The general overhead may include the following overhead information: a version (VER), a tributary port number (TPN), a general communication channel (GCC), a frame type (FT), a tandem connection monitoring (TCM) overhead, a path monitoring (PM) overhead, and the like.

It can be learned that a byte size of the overhead area of the OSU frame is limited, but more overhead information needs to be inserted. An objective of the method provided in this application is to improve efficiency of inserting the overhead information into the overhead area of the OSU frame.

Figure 3:
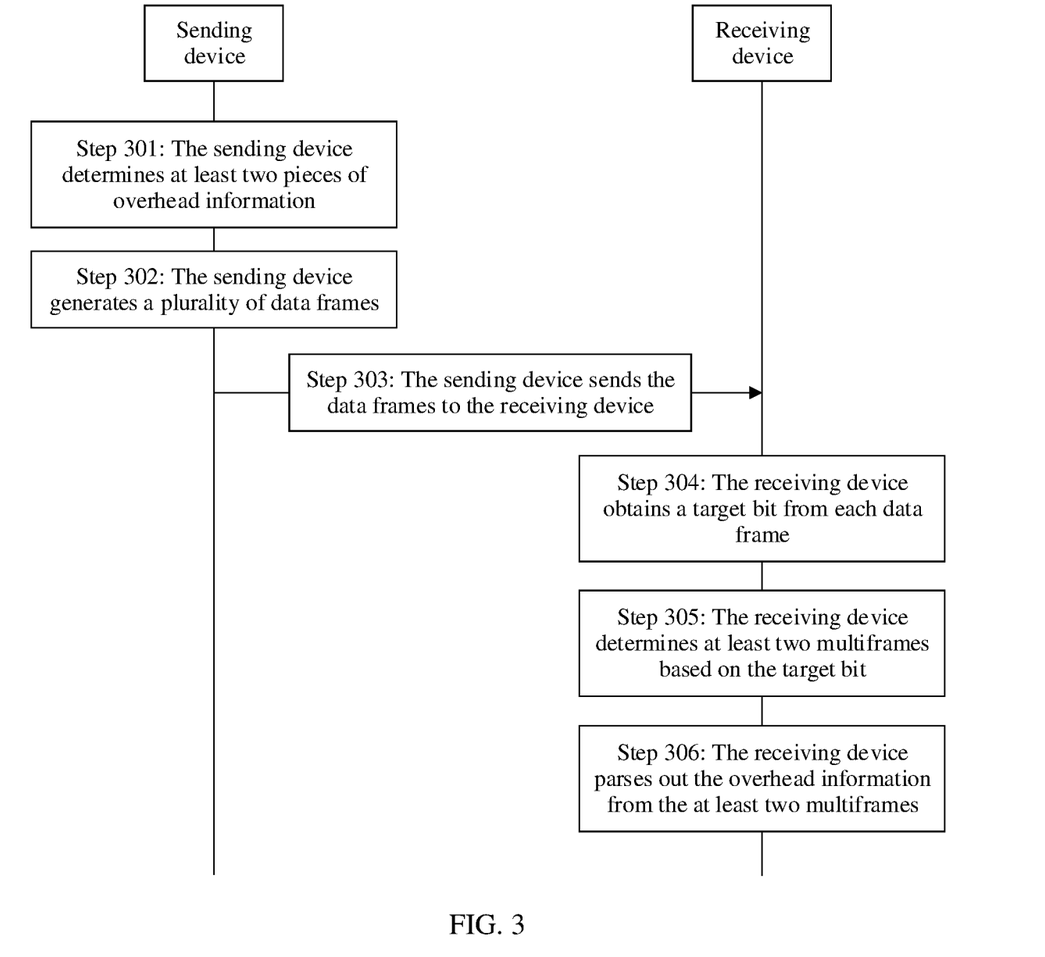
FIG. 3 is a flowchart of steps in an embodiment of a data frame transmission method according to an embodiment of the present invention.

FIG. 3 is a flowchart of steps in an embodiment of a data frame transmission method according to an embodiment of the present invention.

First, it should be noted that an example in which a sending device and a receiving device that perform the method shown in this embodiment are two interconnected OTN devices included in the OTN 200 shown in FIG. 1 is used for description, and imposes no limitation. In another embodiment, the sending device and the receiving device may alternatively be two devices that need to exchange a data frame in a PON, or may be two devices that need to exchange a data frame in a FlexE.

Step 301: The sending device determines at least two pieces of overhead information.

In this embodiment, an amount of overhead information sent by the sending device to the receiving device by using a multiframe is not limited, provided that two or more pieces of overhead information are sent by using the multiframe. In this embodiment, an example in which the sending device needs to send first overhead information and second overhead information to the receiving device, and a quantity of bits occupied by the second overhead information is greater than a quantity of bits occupied by the first overhead information is used for description.

A specific type of the first overhead information and a specific type of the second overhead information are not limited in this embodiment. For example, the first overhead information is automatic protection switching (APS) or delay measurement (DM) in the TCM or the PM shown in FIG. 2. For another example, the second overhead information is a trail trace identifier (trail trace identifier, TTI).

Step 302: The sending device generates a plurality of data frames.

To send the first overhead information and the second overhead information to the receiving device, the sending device generates the plurality of data frames, and determines a first multiframe and a second multiframe in the plurality of data frames. The first overhead information is inserted into a plurality of data frames included in the first multiframe, and the second overhead information is inserted into a plurality of data frames included in the second multiframe.

Specifically, an overhead area of each data frame included in the first multiframe includes a first field. The sending device inserts the first overhead information into the first field. For example, if a quantity of bits occupied by the first field in the data frame is one, and the first multiframe includes 32 data frames, the sending device may insert the first overhead information into bit space that is of the first multiframe and that includes 32×1=32 bits.

An overhead area of each data frame included in the second multiframe includes a second field. The sending device inserts the second overhead information into the second field. A location of the first field and a location of the second field are different in the data frame. For example, if a quantity of bits occupied by the second field in the data frame is one, and the second multiframe includes 512 data frames, the sending device may insert the second overhead information into bit space that is of the second multiframe and that includes 512×1=512 bits.

To indicate, to the receiving device, the first multiframe into which the first overhead information is inserted and the second multiframe into which the second overhead information is inserted, the sending device needs to insert a target bit into the overhead area of the data frame in a process of generating the plurality of data frames. The first multiframe and the second multiframe are indicated to the receiving device by using the target bit. The receiving device may parse out the first overhead information from the first multiframe and parse out the second overhead information from the second multiframe based on the target bit. A location of the target bit in the overhead area of the data frame is different from each of the location of the first field and the location of the second field. For example, the target bit may be located in the TCM or the PM, and is at a location different from the location of the first field and the location of the second field.

In this embodiment, a specific bit quantity of the target bit is not limited, provided that the target bit can simultaneously indicate the first multiframe and the second multiframe. For example, the bit quantity of the target bit in this embodiment is less than a quantity of bits occupied by an MFAS in an existing OTN frame. If the MFAS occupies 8 bits, the bit quantity of the target bit in this embodiment may be any integer less than eight and greater than or equal to one. For example, if the bit quantity of the target bit is one, the first multiframe and the second multiframe can be indicated by using the 1-bit target bit. It can be learned that, if the target bit can simultaneously indicate the first multiframe and the second multiframe, efficiency of inserting the overhead information into the overhead area of the data frame is effectively improved, and a bandwidth resource is effectively saved.

In order that the target bit can simultaneously indicate the first multiframe and the second multiframe, the target bit needs to achieve the following two objectives.

Objective 1: The target bit can indicate a frame boundary of the first multiframe. The frame boundary of the first multiframe is a $1^{st}$ data frame and a last data frame in a plurality of consecutive data frames included in the first multiframe.

Objective 2: The target bit can indicate a frame boundary of the second multiframe. The frame boundary of the second multiframe is a $1^{st}$ first multiframe and a last first multiframe in a plurality of consecutive first multiframes included in the second multiframe.

Figure 4:
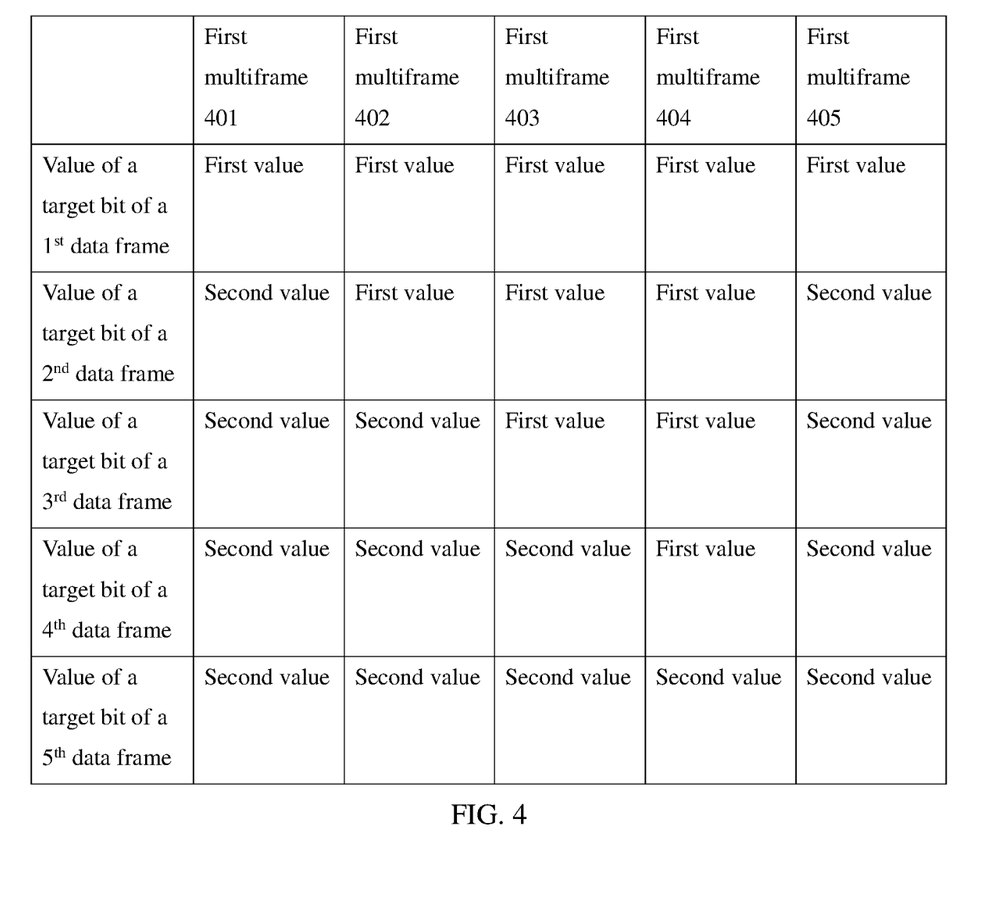
FIG. 4 is an example diagram of Embodiment 1 of a value of a target bit of a data frame according to this application.

The following describes, with reference to FIG. 4, a process in which the target bit achieves Objective 1. FIG. 4 is an example diagram of Embodiment 1 of a value of a target bit of a data frame according to this application.

The first multiframe in this embodiment includes M consecutive data frames. To be specific, the first multiframe includes a $1^{st}$ data frame, a $2^{nd}$ data frame, . . . , and an $M^{th}$ data frame. In this embodiment, a specific value of M is not limited, provided that M is a positive integer greater than 1. An example in which M=5 is used for description in FIG. 4. It can be learned that, in this example, the first multiframe includes five data frames.

The sending device sets, to a first value, a value of a target bit in the $1^{st}$ data frame included in the first multiframe. The first value is not limited in this embodiment. For example, if the bit quantity of the target bit is one, the first value may be "0", or may be "1". For another example, if the bit quantity of the target bit is two, the first value may be "01", or the like.

The sending device sets, to a second value, a value of a target bit in the last data frame included in the first multiframe. The first value and the second value in this embodiment are different from each other, and the second value is not limited in this embodiment. For example, if the first value is "1", the second value is "0".

It can be learned that in the M consecutive data frames included in the first multiframe in this embodiment, the values of the target bits in the two data frames located at the frame boundary are different from each other. In different first multiframes, values of target bits in $1^{st}$ data frames are the same, and values of target bits in last data frames are also the same.

There are two cases of a value of a target bit in a data frame that is included in the first multiframe and that is within the frame boundary: In one case, values of two adjacent target bits included in the first multiframe each are the first value. In another case, values of two adjacent target bits included in the first multiframe transition from the first value (transition) to the second value. The two adjacent target bits included in the first multiframe are located in overhead areas of two adjacent data frames.

The following describes how a plurality of consecutive target bits included in the first multiframe specifically indicate the frame boundary of the first multiframe.

The value of the target bit transitions from the second value to the first value, so that the sending device indicates the receiving device to identify a frame boundary of two adjacent first multiframes. In FIG. 4, the two adjacent first multiframes (401 and 402) are used as an example. The first multiframe 401 is a former multiframe in the two adjacent multiframes, and the first multiframe 402 is a latter multiframe in the two adjacent multiframes.

The sending device determines a first target bit and a second target bit. The first target bit is a target bit in a last data frame (namely, a $5^{th}$ data frame) in the first multiframe 401. The second target bit is a target bit in a $1^{st}$ data frame in the first multiframe 402.

To indicate a transition between the first multiframe 401 and the first multiframe 402, the sending device sets a value of the first target bit to the second value. The sending device sets a value of the second target bit to the first value. It can be learned that the receiving device can determine, based on a transition from the first target bit whose value is the first value to the second target bit whose value is the second value, that a data frame including the first target bit is the last data frame in the first multiframe 401. The receiving device may further determine that a data frame including the second target bit is the $1^{st}$ data frame in the first multiframe 402.

It should be noted that, in the first multiframe in this embodiment, values of target bits of two adjacent data frames do not transition from the second value to the first value, to effectively avoid confusion between the frame boundary included in the first multiframe and the data frame located within the frame boundary.

The following describes a process in which the sending device achieves Objective 2.

Specifically, the sending device can indicate the frame boundary of the second multiframe based on a value of each target bit in each first multiframe. The following describes two manners of indicating the frame boundary of the second multiframe.

Manner 1: First, the sending device determines a target quantity N. The target quantity N indicates a ranking of the first multiframe in the second multiframe. Still refer to FIG. 4. If the first multiframe 401 is a first multiframe ranked first in the second multiframe, a target quantity N of the first multiframe 401 is 1. If a first multiframe 404 is a first multiframe ranked last in the second multiframe, a target quantity N of the first multiframe 404 is 4.

In addition, the sending device sets a value of each of first N target bits in all target bits included in the first multiframe to the first value. For example, the sending device determines that a value of a $1^{st}$ target bit in the first multiframe 401 ranked first in the second multiframe is the first value, and values of the other target bits each are the second value. For another example, the sending device determines that values of first four target bits in the first multiframe 404 ranked fourth in the second multiframe each are the first value, and values of the other target bits each are the second value.

It can be learned that, in this manner, a quantity of target bits that are included in each first multiframe and whose values are the first value indicates a ranking of each first multiframe in the second multiframe. The receiving device may determine the frame boundary of the second multiframe based on the ranking of each first multiframe in the second multiframe.

The frame boundary of the second multiframe includes a multiframe including a smallest quantity of target bits whose values are the first value (the $1^{st}$ first multiframe in the plurality of first multiframes included in the second multiframe), and the frame boundary of the second multiframe further includes a multiframe including a largest quantity of target bits whose values are the first value (the last first multiframe in the plurality of first multiframes included in the second multiframe).

It should be noted that, in this embodiment, an example in which ascending order of the target bits that are included in the first multiframe and whose values are the first value indicates the ranking of each first multiframe in the second multiframe is used for description, and imposes no limitation. For example, in another example, descending order of the target bits that are included in the first multiframe and whose values are the first value may alternatively be used to indicate the ranking of the first multiframe in the second multiframe.

Manner 2: First, the sending device determines a target quantity N. For a specific process, refer to Manner 1. Details are not described.

In addition, the sending device determines that values of first C target bits in all target bits included in the first multiframe each are the first value. Herein, C is an integer multiple of N. For example, if a target quantity N of one first multiframe included in the second multiframe is 3, the sending device may set values of first C=3>2=6 target bits in the first multiframe to the first value, and set values of the other target bits to the second value.

Step 303: The sending device sends the data frames to the receiving device.

Step 304: The receiving device obtains a target bit from each data frame.

Specifically, the receiving device presets a search periodicity. The receiving device continuously obtains M data frames in the search periodicity. It can be learned from the descriptions that the first multiframe includes the M data frames. In this embodiment, an example in which the receiving device continuously obtains the M data frames in the search periodicity is used for description.

The receiving device obtains a target bit included in each of the M data frames obtained in the search periodicity. For example, the sending device and the receiving device may agree in advance that a preset field is used to carry the target bit in a TCM of an overhead area of each data frame. Descriptions of a specific location of the preset field in the overhead area of the data frame in this embodiment are an optional example, and impose no limitation.

Step 305: The receiving device determines at least two multiframes based on the target bit.

It can be learned from the descriptions that, in this embodiment, an example in which multiframes sent by the sending device to the receiving device are the first multiframe and the second multiframe is provided. The following first describes a process in which the receiving device determines the first multiframe.

The receiving device may identify a frame boundary of each first multiframe based on values of target bits in any two adjacent data frames. In two target bits included in two continuously found data frames in a $1^{st}$ search periodicity, if a value of a former target bit is the second value, and a value of a latter target bit is the first value, it indicates that the two data frames including the two target bits are located at a frame boundary of the two first multiframes.

If the receiving device determines that values of the two target bits included in the two continuously found data frames each are the first value or the second value, it indicates that the two data frames are located in a same first multiframe. In addition, if the receiving device determines that, in the two target bits included in the two continuously found data frames, the value of the former target bit is the first value, and the value of the latter target bit is the second value, it also indicates that the two data frames including the two target bits are located in a same first multiframe.

An example description of a specific search process of the receiving device continues to be provided with reference to FIG. 4.

If a $1^{st}$ data frame found by the receiving device in the search periodicity is a $3^{rd}$ data frame in the first multiframe 401. If a value of a target bit in the $3^{rd}$ data frame is the second value, it indicates that the $3^{rd}$ data frame is a data frame located within the frame boundary of the first multiframe 401. A search is sequentially carried out until the receiving device finds a data frame including the first target bit and a data frame including the second target bit. For descriptions of the first target bit and the second target bit, refer to step 302. Details are not described. It can be learned that if the receiving device finds two data frames in which the first target bit whose value is the second value transitions to the second target bit whose value is the first value, a transition between two first multiframes may be determined.

However, to avoid misjudging the frame boundary of the first multiframe due to a bit error, after finding the transition from the first target bit whose value is the second value to the second target bit whose value is the first value, and after M frames, the receiving device identifies whether a $2^{nd}$ transition from the first target bit whose value is the second value to the second target bit whose value is the first value occurs. If the $2^{nd}$ transition occurs, no bit error occurs. The receiving device may determine that the data frame including the first target bit is a last data frame in the first multiframe. The receiving device may further determine that the data frame including the second target bit is a $1^{st}$ data frame in the first multiframe. The foregoing operations are repeated, until the receiving device can sequentially determine a $1^{st}$ data frame and a last data frame included in each first multiframe.

Then, a process in which the receiving device determines the second multiframe is described.

When the receiving device has determined each first multiframe, the frame boundary of the second multiframe may be determined based on a target bit that is included in each first multiframe and whose value is the first value. Specifically, first, the receiving device determines that one of the plurality of first multiframes is a target first multiframe. In addition, the receiving device determines the target quantity based on the target bit that is included in the target first multiframe and whose value is the first value. For example, in Manner 1 in step 302, if a quantity of target bits that are included in the target first multiframe and whose values are the first value is N, it is determined that the target quantity is N. For another example, in Manner 2 in step 302, if a quantity of target bits that are included in the target first multiframe and whose values are the first value is C, it is determined that the target quantity is N=C/X, where C is X times of N. Specifically, for example, if the receiving device determines that C=6, and predetermines that X is 2, it may be determined that N=6/2=3. The target quantity indicates the ranking of the first multiframe in the second multiframe.

Specifically, if it is determined, based on the target first multiframe, that N=1, it indicates that the target first multiframe is a $1^{st}$ first multiframe in the second multiframe. Optionally, the receiving device may obtain in advance a frame quantity of the first multiframe included in each second multiframe, so that the receiving device may determine the frame boundary of the second multiframe. The receiving device determines that a first multiframe whose target quantity N=1 in the plurality of consecutive first multiframes is the $1^{st}$ first multiframe (the first multiframe 401 shown in FIG. 4) in the second multiframe. A first multiframe whose target quantity N is equal to a frame quantity is the last first multiframe in the second multiframe. For example, if the frame quantity is 4, the receiving device determines that the target quantity N of the first multiframe 404 is equal to 4, and it indicates that the first multiframe 404 is the last first multiframe included in the second multiframe.

It can be learned from the foregoing that target quantities of first multiframes included in the second multiframe is in ascending order. If the receiving device detects that target quantities of two adjacent first multiframes transition from a small value to a large value, it indicates that the two adjacent first multiframes are located in a same second multiframe. If the receiving device detects that target quantities of two adjacent first multiframes transition from a large value to a small value, it indicates that the two adjacent first multiframes are located in two adjacent second multiframes. In the two adjacent first multiframes, a first multiframe with a larger target quantity is a last first multiframe in a former second multiframe. A first multiframe with a smaller target quantity is a $1^{st}$ first multiframe in a latter second multiframe.

It should be noted that, in this embodiment, an example in which the target quantities of the first multiframes included in the second multiframe are in ascending order is used for description. In another example, the target quantities of the first multiframes included in the second multiframe may alternatively be in descending order, provided that the target quantity of each first multiframe can indicate a ranking of each first multiframe in the second multiframe.

As shown in FIG. 4, if target quantities of the first multiframes 401, 402, 403, and 404 are in ascending order, it indicates that the first multiframes 401, 402, 403, and 404 are located in a same second multiframe. If the target quantity N of the first multiframe 404 is equal to 4, and a target quantity N of a first multiframe 405 is equal to 1, it indicates that the first multiframe 404 is a last first multiframe in the former second multiframe, and the first multiframe 405 is a $1^{st}$ first multiframe in the latter second multiframe.

Step 306: The receiving device parses out the overhead information from the at least two multiframes.

It can be learned from the foregoing that the first multiframe is used to carry the first overhead information, and the second multiframe is used to carry the second overhead information. The receiving device may parse out the first overhead information from each determined first multiframe, and may parse out the second overhead information from each determined second multiframe.

In the method in this embodiment, the target bit located in the data frame simultaneously indicates the at least two multiframes, so that efficiency of indicating a multiframe is improved, and complexity of indicating the multiframe is reduced, to improve efficiency and accuracy of performing frame alignment on a multiframe by using the target bit. In addition, the bit quantity of the target bits is less than an existing bit quantity of information (for example, the MFAS) for indicating the multiframe, to effectively save a bandwidth resource, and improve utilization efficiency of a bandwidth resource for indicating the multiframe.

Figure 5:
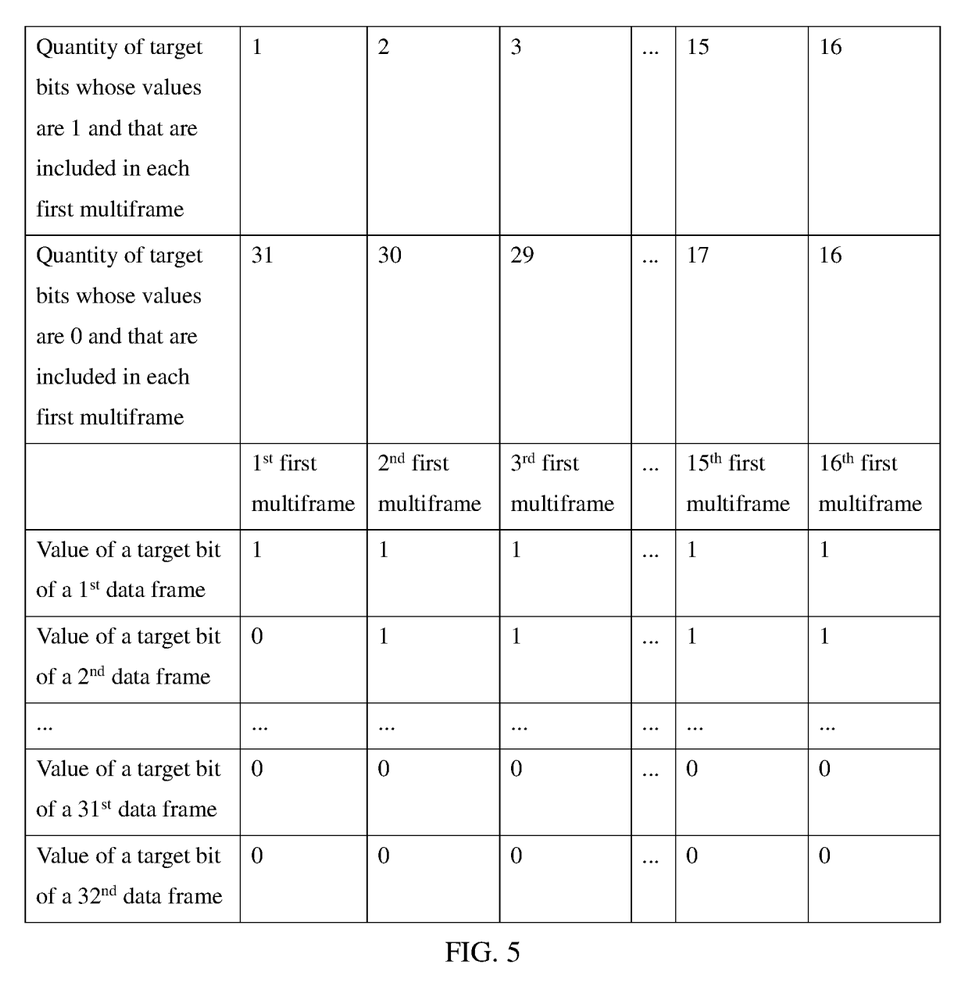
FIG. 5 is an example diagram of Embodiment 2 of a value of a target bit of a data frame according to this application.

To better understand a process in which the target bit indicates the at least two multiframes in this application, the following describes, with reference to FIG. 5, a first application scenario of the target bit provided in this application. FIG. 5 is an example diagram of Embodiment 2 of a value of a target bit of a data frame according to this application.

In the application scenario shown in FIG. 5, an example in which the first overhead information is APS and the second overhead information is a TTI is used for description. The first multiframe for carrying the first overhead information can completely carry one piece of APS overhead information only by using 32 data frames included in the first multiframe. The second multiframe for carrying the second overhead information can completely carry one piece of TTI overhead information only by using 16 first multiframes included in the second multiframe (a total of 512 data frames). Therefore, the sending device determines that each first multiframe includes 32 data frames, and each second multiframe includes 16 first multiframes.

In this application scenario, an example in which a bit quantity of the target bit is one is used for description. Specifically, in a $1^{st}$ first multiframe generated by the sending device, there is one target bit whose value is "1", and there are 31 target bits whose values are "0". In addition, a value of a target bit of a $1^{st}$ data frame included in the first multiframe is "1", and a value of a target bit of a $2^{nd}$ data frame to a value of a target bit of a $32^{nd}$ data frame each are "0".

In a $2^{nd}$ first multiframe generated by the sending device, there are two target bits whose values are "1", and there are 30 target bits whose values are "0". In addition, values of target bits of a $1^{st}$ data frame and a $2^{nd}$ data frame that are included in the first multiframe each are "1". A value of a target bit of a $3^{rd}$ data frame to a value of a target bit of a $32^{nd}$ data frame that are included in the first multiframe each are "0".

By analogy, in a $16^{th}$ first multiframe generated by the sending device, there are 16 target bits whose values are "1", and there are 16 target bits whose values are "0". In addition, a value of a target bit of a $1^{st}$ data frame to a value of a target bit of a $16^{th}$ data frame that are included in the first multiframe each are "1". A value of a target bit of a $17^{th}$ data frame to a value of a target bit of a $32^{nd}$ data frame each are "0".

The following describes how the sending device inserts the first overhead information into the first multiframe.

In each first multiframe, the sending device inserts, into a first field of a $1^{st}$ data frame to a first field of a $4^{th}$ data frame that are included in the first multiframe, APS overhead information for indicating a request and/or a status. For descriptions of the first field, refer to FIG. 3. Details are not described. APS overhead information for indicating a protection type is inserted into first fields of a $5^{th}$ data frame to an $8^{th}$ data frame that are included in the first multiframe. APS overhead information for indicating a request signal is inserted into first fields of a $9^{th}$ data frame to a $16^{th}$ data frame that are included in the first multiframe. APS overhead information for indicating a bridged signal is inserted into first fields of a $17^{th}$ data frame to a $24^{th}$ data frame that are included in the first multiframe. APS overhead information for indicating a user response (user response, RES) and/or a reservation are inserted into first fields of a $25^{th}$ data frame to a $32^{nd}$ data frame that are included in the first multiframe. It can be learned that a first field of each data frame included in a complete first multiframe is used to carry a complete piece of APS overhead information.

The following describes how the sending device inserts the second overhead information into the second multiframe.

In each second multiframe, the sending device inserts, into second fields of a total of 256 data frames included in a $1^{st}$ first multiframe to an $8^{th}$ first multiframe that are included in the second multiframe, a TTI for indicating a source access point identifier (SAPI). The sending device inserts, into second fields of 256 data frames included in a $9^{th}$ first multiframe to a $16^{th}$ first multiframe that are included in the second multiframe, a TTI for indicating a destination access point identifier (DAPI). It can be learned that a second field of each data frame included in a complete second multiframe is used to carry a complete TTI.

If the receiving device receives a plurality of data frames from the sending device, the receiving device determines each first multiframe in the plurality of data frames. When the receiving device determines that the value of the target bit transitions from "0" to "1" (transitions from 0 to 1), it indicates that a data frame including the two target bits is located at the frame boundary of the first multiframe. For detailed descriptions of a specific process, refer to step 304 and step 305 shown in FIG. 3. Details are not described.

The receiving device can further determine the frame boundary of the second multiframe based on a frame quantity (in this example, the frame quantity is equal to 16) of each first multiframe. If a $1^{st}$ first multiframe includes one target bit whose value is "1", it indicates that the $1^{st}$ first multiframe is a $1^{st}$ one in the plurality of first multiframes included in the second multiframe. If a $16^{th}$ first multiframe includes 16 target bits whose values are "1", it indicates that the $16^{th}$ first multiframe is a last one in the plurality of first multiframes included in the second multiframe. For detailed descriptions of a specific process, refer to step 304 and step 305 shown in FIG. 3. Details are not described.

If the receiving device determines the first multiframe and the second multiframe, the first overhead information may be parsed out from the first multiframe, and the second overhead information may be parsed out from the second multiframe.

Figure 6:
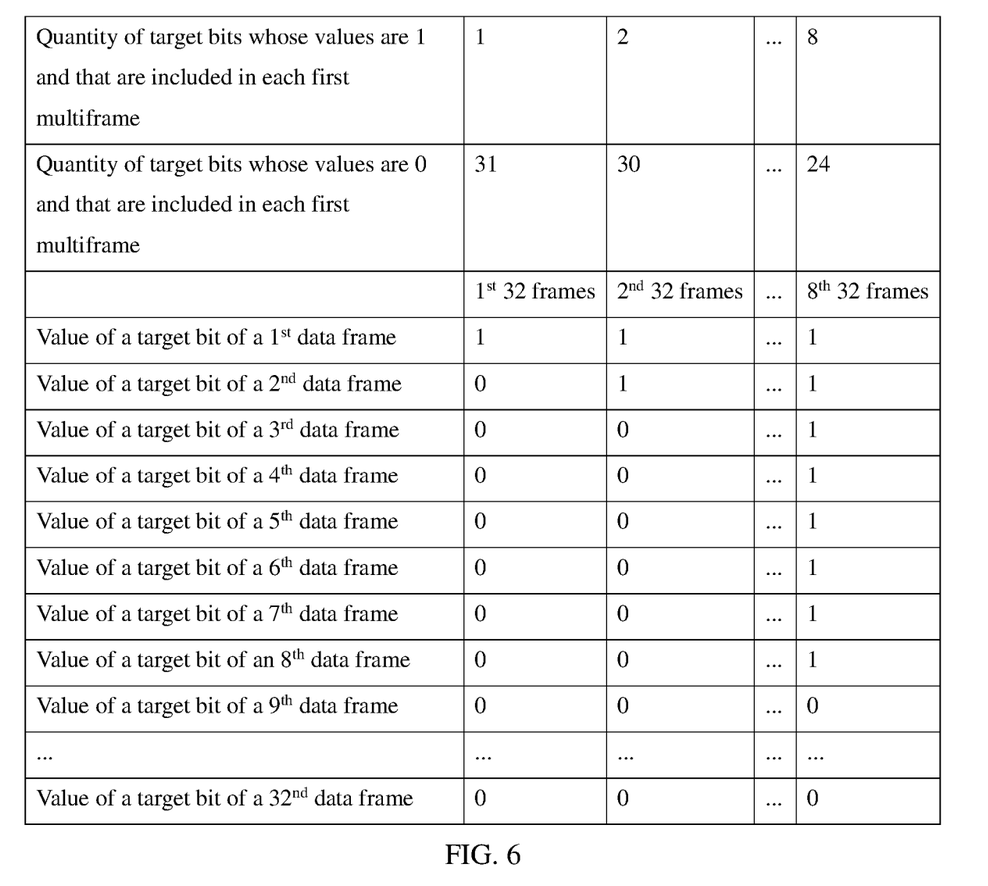
FIG. 6 is an example diagram of Embodiment 3 of a value of a target bit of a data frame according to this application.

The following describes, with reference to FIG. 6, a second application scenario of the target bit provided in this application. FIG. 6 is an example diagram of Embodiment 3 of a value of a target bit of a data frame according to this application.

For descriptions of the first overhead information carried in the first multiframe and the second overhead information carried in the second multiframe in this application scenario, refer to FIG. 5. Details are not described. In this application scenario, an example in which each first multiframe includes 32 data frames, and each second multiframe includes eight first multiframes is used for description.

For a specific description of a value of each target bit included in each first multiframe shown in FIG. 6, refer to FIG. 5. Details are not described.

Figure 7:
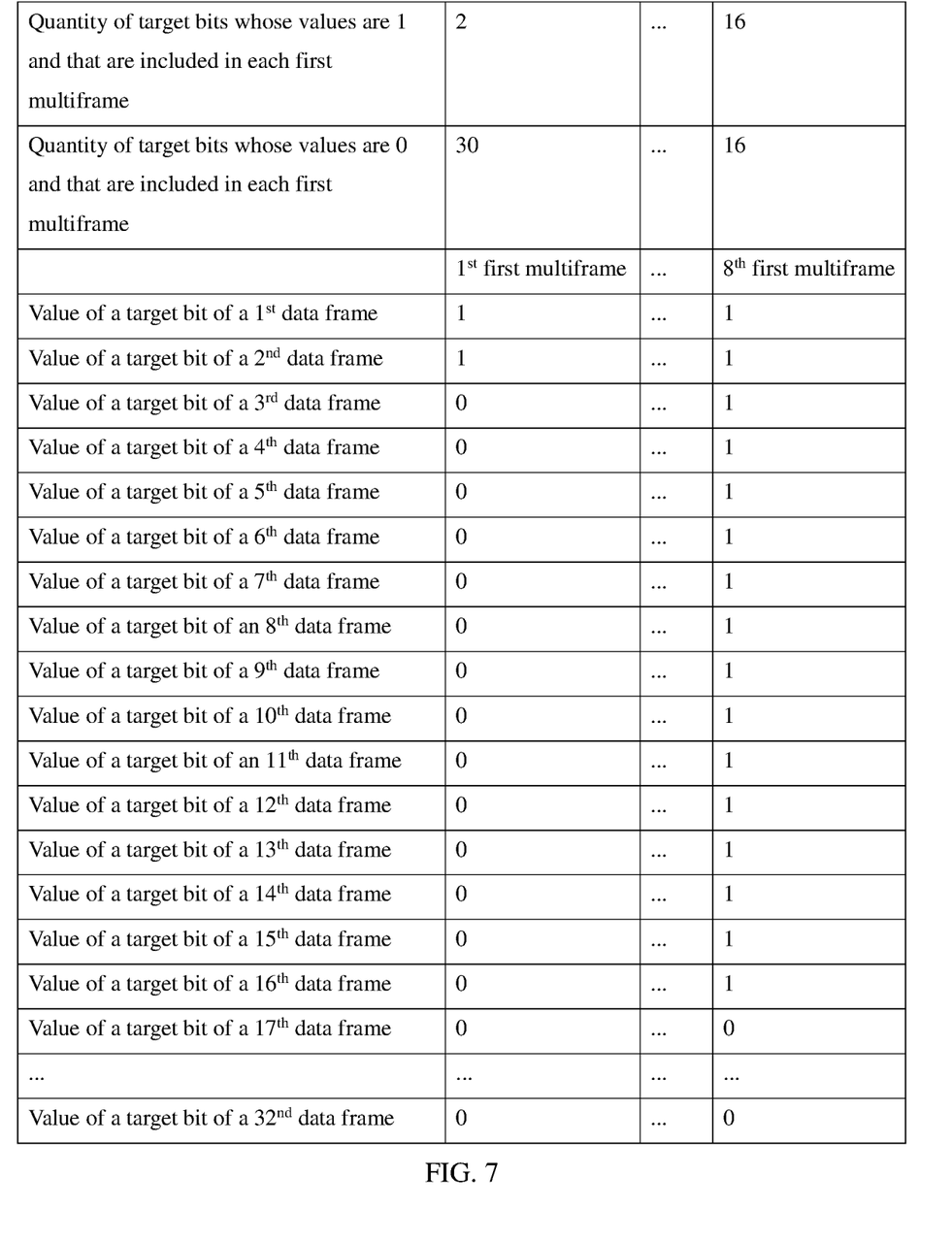
FIG. 7 is an example diagram of Embodiment 4 of a value of a target bit of a data frame according to this application.

The following describes, with reference to FIG. 7, a third application scenario of the target bit provided in this application. FIG. 7 is an example diagram of Embodiment 4 of a value of a target bit of a data frame according to this application.

For descriptions of the first overhead information carried in the first multiframe and the second overhead information carried in the second multiframe in this application scenario, refer to FIG. 5. Details are not described. In this application scenario, an example in which each first multiframe includes 32 data frames, and each second multiframe includes eight first multiframes is used for description.

In this application scenario, an example in which the bit quantity of the target bit is one is used for description. Specifically, in the $1^{st}$ first multiframe generated by the sending device, there are two target bits whose values are "1", and there are 30 target bits whose values are "0". In addition, values of target bits of a $1^{st}$ data frame and a $2^{nd}$ data frame that are included in the first multiframe each are "1", and values of target bits of a $3^{rd}$ data frame to a $32^{nd}$ data frame each are "0".

By analogy, in an $8^{th}$ first multiframe generated by the sending device, there are 16 target bits whose values are "1", and there are 16 target bits whose values are "0". In addition, a value of a target bit of a $1^{st}$ data frame to a value of a target bit of a $16^{th}$ data frame that are included in the first multiframe each are "1", and a value of a target bit of a $17^{th}$ data frame to a value of a target bit of a $32^{nd}$ data frame each are "0".

It can be learned that, in each first multiframe in this application scenario, a quantity of target bits whose values are "1" is two times of the ranking of the first multiframe in the second multiframe. When determining the first multiframe, the receiving device may divide, by 2, data of a target bit that is included in the first multiframe and whose value is "1", and an obtained quotient is the ranking of the first multiframe in the second multiframe.

Figure 8:
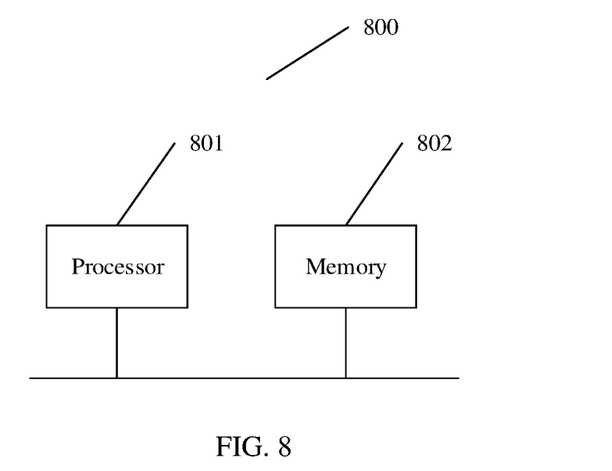
FIG. 8 is an example diagram of a structure in Embodiment 1 of a network device according to this application.

The following describes, with reference to FIG. 8, a structure of a network device provided in this application. FIG. 8 is an example diagram of a structure in an embodiment of a network device according to this application.

A network device 800 in this embodiment includes a processor 801 and a memory 802. The memory 802 is configured to store program instructions and data. The network device may be the sending device in the foregoing embodiment, or may be a receiving device.

When the network device 800 is a sending device, the processor 801 is configured to implement step 301 to step 303 shown in FIG. 3. It should be noted that when the processor 801 performs a sending step shown in step 303, the processor 801 may send a data frame to an optical transceiver, so that the optical transceiver sends the data frame to the receiving device.

When the network device 800 is a receiving device, the processor 801 is configured to implement step 304 to step 306 shown in FIG. 3. It should be noted that a data frame obtained by the processor 801 may be received by an optical transceiver located in the receiving device, and then the optical transceiver sends the received data frame to the processor 801.

In embodiments of this application, the processor 801 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

Program code used by the processor 801 to implement the foregoing method may be stored in the memory 802. The memory 802 is coupled to the processor 801. The coupling in this embodiment of this application is indirect coupling or a communication connection between apparatuses, units, or modules for information exchange between the apparatuses, the units, or the modules, and may be in electrical, mechanical, or other forms. The processor 801 may cooperate with the memory 802. The memory 802 may be a nonvolatile memory, for example, a hard disk drive (HDD), or may be a volatile memory (volatile memory), for example, a random access memory (RAM). The memory 802 is any other medium that can carry or store expected program code in a form of an instruction structure or a data structure and that can be accessed by a computer, but is not limited thereto.

Figure 9:
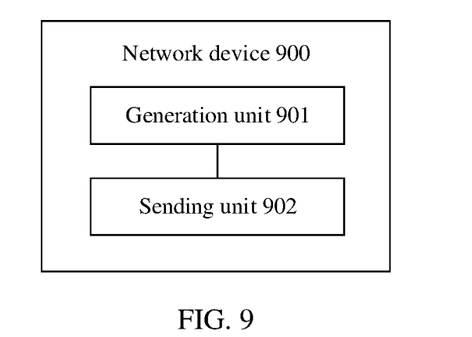
FIG. 9 is an example diagram of a structure in Embodiment 2 of a network device according to this application.
Figure 10:
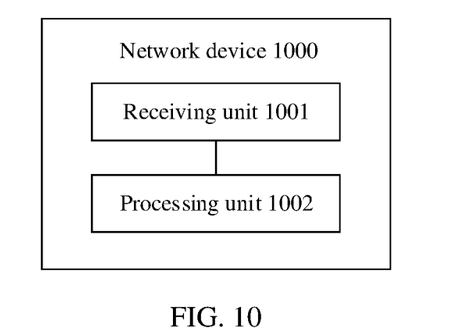
FIG. 10 is an example diagram of a structure in Embodiment 3 of a network device according to this application.

FIG. 9 and FIG. 10 are schematic diagrams of structures of two possible network devices. A network device 900 shown in FIG. 9 includes a generation unit 901 and a sending unit 902. The generation unit 901 is configured to perform step 301 and step 302 shown in FIG. 3. The sending unit 902 is configured to perform step 303 shown in FIG. 3. A network device 1000 shown in FIG. 10 includes a receiving unit 1001 and a processing unit 1002. The receiving unit 1001 is configured to receive a data frame from a sending device. The processing unit is configured to perform step 304 to step 306 shown in FIG. 3.

Persons skilled in the art should understand that units included in the network device 900 and the network device 1000 may be implemented by using one or more processors.

Based on the foregoing embodiments, an embodiment of this application further provides a computer-readable storage medium. The storage medium stores a software program. When the software program is read and executed by one or more processors, the method provided in the foregoing embodiment may be implemented. The computer-readable storage medium may include any medium that may store program code such as a USB flash drive, a removable hard disk, a read-only memory, a random access memory, a magnetic disk, or an optical disc.

Based on the foregoing embodiments, an embodiment of this application further provides a chip. The chip includes a processor, and the processor is configured to implement a function in any one or more of the foregoing embodiments, for example, obtain or process a data frame in the foregoing method. Optionally, the chip further includes a memory, and the memory is configured to store necessary program instructions and data executed by the processor. The chip may include a chip, or include a chip and another discrete device.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof. Such modifications or replacements do not make the essence of the corresponding technical solutions depart from the spirit and scope of the technical solutions of embodiments of the present invention.

What is claimed is:
1. A method, comprising:
generating a first data frame, wherein an overhead area of the first data frame comprises a target bit, target bits comprised in a plurality of data frames indicate at least two multiframes that each comprise consecutive data frames of the plurality of data frames, different multiframes of the at least two multiframes comprise different quantities of data frames, different overhead information is inserted into the different multiframes, the first data frame is an optical transport network (OTN) data frame, and the target bit is comprised in the target bits; and sending the first data frame.

2. The method according to claim 1, wherein generating the first data frame comprises:

respectively inserting a plurality of target bits into overhead areas of a plurality of consecutive data frames comprised in a first multiframe of the at least two multiframes, wherein values of at least two adjacent target bits in the plurality of target bits each are a first value, and values of another two adjacent target bits in the plurality of bits transition from a first value to a second value, and the first value is different from the second value.

3. The method according to claim 2, wherein generating the first data frame comprises:

respectively inserting a first target bit and a second target bit into two adjacent first multiframes of the at least two multiframes, wherein the first target bit is located in a last data frame in an earlier first multiframe in the two adjacent first multiframes, the second target bit is located in a $1^{st}$ data frame in a later first multiframe in the two adjacent first multiframes, a value of the first target bit is the second value, and a value of the second target bit is the first value.

4. The method according to claim 3, wherein the at least two multiframes further comprise a second multiframe, the second multiframe comprises a plurality of first multiframes, and generating the first data frame comprises:

determining a target quantity, wherein the target quantity indicates a ranking of a target first multiframe in the second multiframe; and determining, based on the target quantity, a value of a target bit comprised in the target first multiframe, and wherein the value of the target bit comprised in the target first multiframe further indicates a frame boundary of the second multiframe.

5. The method according to claim 4, wherein the target quantity is N, N is a positive integer greater than or equal to 1, and wherein the determining, based on the target quantity, the value of the target bit comprised in the target first multiframe comprises:

determining that values of first N target bits in a plurality of target bits comprised in the target first multiframe each are the first value.

6. The method according to claim 4, wherein the target quantity is N, N is a positive integer greater than or equal to 1, and determining, based on the target quantity, the value of a target bit comprised in the target first multiframe comprises:

determining that values of first C target bits in a plurality of target bits comprised in the target first multiframe each are the first value, wherein C is an integer multiple of N.

7. The method according to claim 6, wherein the frame boundary of the second multiframe comprises a multiframe comprising a smallest quantity of target bits whose values are the first value, and the frame boundary of the second multiframe further comprises a multiframe comprising a largest quantity of target bits whose values are the first value.

8. The method according to claim 7, wherein a bit quantity of the target bit is 1.

9. A method, comprising:

receiving a plurality of data frames, wherein an overhead area of each data frame of the plurality of data frames comprise a target bit, the target bits comprised in the plurality data frames indicate at least two multiframes that are comprised in the plurality of data frames, each multiframe of the at least two multiframes comprises consecutive data frames of the plurality of data frames, different multiframes of the at least two multiframes comprise different quantities of data frames, different overhead information is inserted into the different multiframes, each data frame of the plurality of data frames is an optical transport network (OTN) data frame, and the target bit is comprised in the target bits;

obtaining the target bits from the plurality of data frames; and determining the at least two multiframes in the plurality of data frames based on the target bits.

10. The method according to claim 9, wherein determining the at least two multiframes in the plurality of data frames based on the target bits comprises:

determining a first multiframe in the plurality of data frames, wherein in a plurality of target bits comprised in the first multiframe, values of at least two adjacent target bits of the target bits comprised in the first multiframe each are a first value, values of another two adjacent target bits of the target bits comprised in the first multiframe transition from a first value to a second value, and the first value and the second value are different from each other.

11. The method according to claim 10, wherein determining the at least two multiframes in the plurality of data frames based on the target bit comprises:

determining a first target bit and a second target bit that are adjacent to each other in the plurality of data frames, wherein a value of the first target bit is the second value, and a value of the second target bit is the first value; and determining that the first target bit and the second target bit are located in two adjacent first multiframes, wherein the first target bit is located in a last data frame in an earlier multiframe in the two adjacent first multiframes, and the second target bit is located in a $1^{st}$ data frame in a later multiframe in the two adjacent first multiframes.

12. The method according to claim 11, wherein the at least two multiframes comprise a second multiframe, the second multiframe comprises a plurality of first multiframes, and determining the at least two multiframes in the plurality of data frames based on the target bits comprises:

determining a target quantity based on a value of a target bit comprised in a target first multiframe of the plurality of first multiframes comprised in the second multiframe, wherein the target quantity indicates a ranking of the target first multiframe in the second multiframe.

13. The method according to claim 12, wherein determining the target quantity based on the value of the target bit comprised in a target first multiframe comprises:

when values of first N target bits in a plurality of target bits comprised in the target first multiframe each are the first value, determining that the target quantity is equal to N.

14. The method according to claim 13, wherein determining the at least two multiframes in the plurality of data frames based on the target bits comprises:

determining a frame boundary of the second multiframe, wherein the frame boundary of the second multiframe comprises a multiframe with a smallest quantity of target bits whose values are the first value, and the frame boundary of the second multiframe further comprises a multiframe with a largest quantity of target bits whose values are the first value.

15. The method according to claim 14, wherein a bit quantity of the target bits is 1.

16. The method according to claim 12, wherein determining the target quantity based on the value of the target bit comprised in the target first multiframe comprises:
when values of first C target bits in a plurality of target bits comprised in the target first multiframe each are the first value, determining that the target quantity is equal to a quotient of C.

17. A digital processing chip, wherein the chip comprises a processor and a memory, the memory and the processor are interconnected, the memory stores instructions, and the processor is configured to execute the instructions to perform:
generating a first data frame, wherein an overhead area of the first data frame comprises a target bit, target bits comprised in a plurality of data frames indicate at least two multiframes that each comprise consecutive data frames of the plurality of data frames, different multiframes comprise different quantities of data frames, different overhead information is inserted into the different multiframes, the first data frame is an optical transport network OTN data frame, and the target bit is comprised in the target bits; and
sending the first data frame.

18. The digital processing chip according to claim 17, wherein the processor is configured to execute the instructions to:
respectively insert a plurality of target bits into overhead areas of a plurality of consecutive data frames comprised in a first multiframe of the at least two multiframes, wherein values of at least two adjacent target bits in the plurality of target bits each are a first value, and values of another two adjacent target bits transition from a first value to a second value, and the first value is different from the second value.

19. The digital processing chip according to claim 18, wherein the processor is configured to execute the instructions to:
respectively insert a first target bit and a second target bit into two adjacent first multiframes of the at least two first multiframes, wherein the first target bit is located in a last data frame in an earlier multiframe in the two adjacent first multiframes, the second target bit is located in a $1^{st}$ data frame in a later multiframe in the two adjacent first multiframes, a value of the first target bit is the second value, and a value of the second target bit is the first value.

20. The digital processing chip according to claim 19, wherein the at least two multiframes further comprise a second multiframe, the second multiframe comprises a plurality of first multiframes, and the processor is configured to execute the instructions to:
determine a target quantity, wherein the target quantity indicates a ranking of a target first multiframe in the second multiframe; and
determine, based on the target quantity, a value of a target bit comprised in the target first multiframe, wherein the value of the target bit further indicates a frame boundary of the second multiframe.

* * * * *